United States Patent [19]
Okudaira

[11] Patent Number: 4,702,568
[45] Date of Patent: Oct. 27, 1987

[54] PHOTOGRAPHIC LENS WITH LARGE APERTURE RATIO

[75] Inventor: Sadao Okudaira, Tokyo, Japan

[73] Assignee: Asahi Kogaku Kogyo Kabushiki Kaisha, Tokyo, Japan

[21] Appl. No.: 569,465

[22] Filed: Jan. 9, 1984

[30] Foreign Application Priority Data

Feb. 16, 1983 [JP] Japan .................. 58-24358

[51] Int. Cl.⁴ .................................. G02B 9/62
[52] U.S. Cl. .................................. 350/464
[58] Field of Search .................. 350/464, 413

[56] References Cited
U.S. PATENT DOCUMENTS

| | | | |
|---|---|---|---|
| 3,486,808 | 12/1969 | Hamblen | 350/413 |
| 3,637,295 | 1/1972 | Matsumura et al. | 350/413 |
| 4,182,550 | 1/1980 | Yamaguchi | 350/464 |
| 4,508,434 | 4/1985 | Ogawa | 350/464 |

Primary Examiner—John K. Corbin
Assistant Examiner—Rebecca D. Gass
Attorney, Agent, or Firm—Lyon & Lyon

[57] ABSTRACT

A photographic lens with a large aperture ratio comprises a plurality of lens elements brighter than F 1.5 and having a total covering power of at least 40°, with at least one of the lens elements being capable of passing an entire luminous flux focusing on a center of an image plane through at least 80 percent of a lens aperture thereof, and given a monotonous refractive index variation in the direction of an optical axis of the lens.

5 Claims, 6 Drawing Figures

PHOTOGRAPHIC LENS WITH LARGE APERTURE RATIO

BACKGROUND OF THE INVENTION

The present invention relates to a photographic lens having a large aperture ratio.

As recent years have seen diverse photographic lens users, there has been an increasing demand for higher performance photographic lenses of large aperture ratio. The greatest problem in achieving higher performance in the design of lens systems having a large aperture ratio which are used primarily as photographic lenses is the difficulty in correcting aberrations such as spherical aberration and sagittal coma. If sagittal coma is produced, then the contrast at low frequencies in normal photographing operation is lowered, and a bright point object photographed at night has a light patch flaring away to one side like a tail, resulting in a degraded photographed image. There is known an optical system incorporating an aspherical lens surface for removing spherical aberration and coma to thereby eliminate the foregoing shortcoming. According to the present invention, a gradient refractive index which has been developed and has found use in optical communications in recent years is incorporated in lens elements for higher lens performance.

The presently available techniques for manufacturing lenses with gradient refractive indexes include an ion exchange process, a crystal growing process, a chemical vapor deposition process, and many other processes. With the prior processes, however, the depth of a layer having a gradient refractive index is about 10 mm, and the gradient refractive index varies about 0.06 for practical purposes.

The first photographic lens in which a gradient refractive index is incorporated was designed by Dr. Moore et al. of Rochester University and presented in the international conference on gradient refractive index held in Hawaii, U.S.A. in 1981. According to their design, an ordinary Gaussian photographic lens of six homogeneous elements having spherical surfaces with an F number of 1:1.0 and a focal length of 50 mm can be designed only with two-element lens having a gradient refractive index. Concerning the potential ability of the gradient refractive index, the designed lens has a gradient refractive index varying across an increased depth by $\Delta N = 0.12$ in a radial direction normal to the optical axis. The lens manufacturing technique available today however fails to fabricate such a lens.

SUMMARY OF THE INVENTION

It is an object of the present invention to provide a high performance photographic lens having a large aperture ratio which can be fabricated by the presently available manufacturing technique.

According to the present invention, a photographic lens having a large aperture ratio is composed of a plurality of lens elements brighter than F 1.5 and having a total covering power of at least 40°, with at least one of the lens elements being capable of passing an entire luminous flux focusing on a center of an image plane through at least 80 percent of a lens aperture thereof, for correcting various aberration, particularly, spherical aberration, and sagittal coma, of the lens. In the foregoing at least one of the lens elements is given a monotonous refractive index distribution in the direction of an optical axis of the lens.

With the refractive index variation in the direction of the optical axis, the lens of a large aperture ratio is capable of correcting various aberrations that are difficult to correct which are produced by a combination of lenses having spherical surfaces, particularly spherical aberration and coma which is produced when astigmatism is sufficiently corrected.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
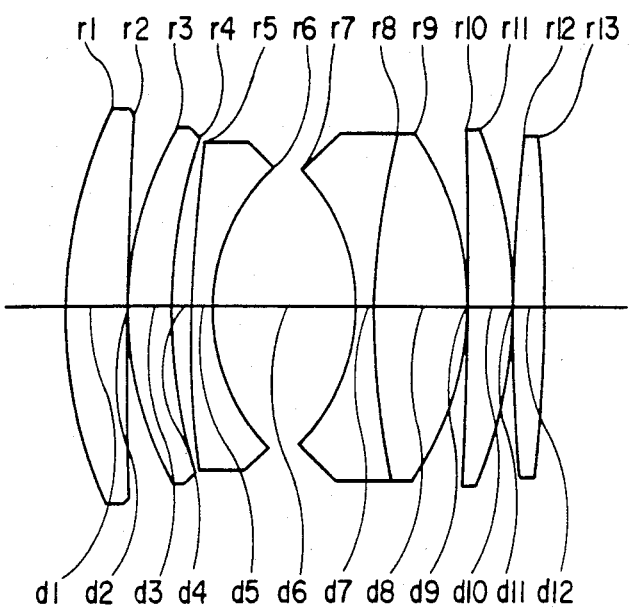
FIG. 1 is a schematic view of the arrangement of a photographic lens according to Example 1 of the present invention.
Figure 2:
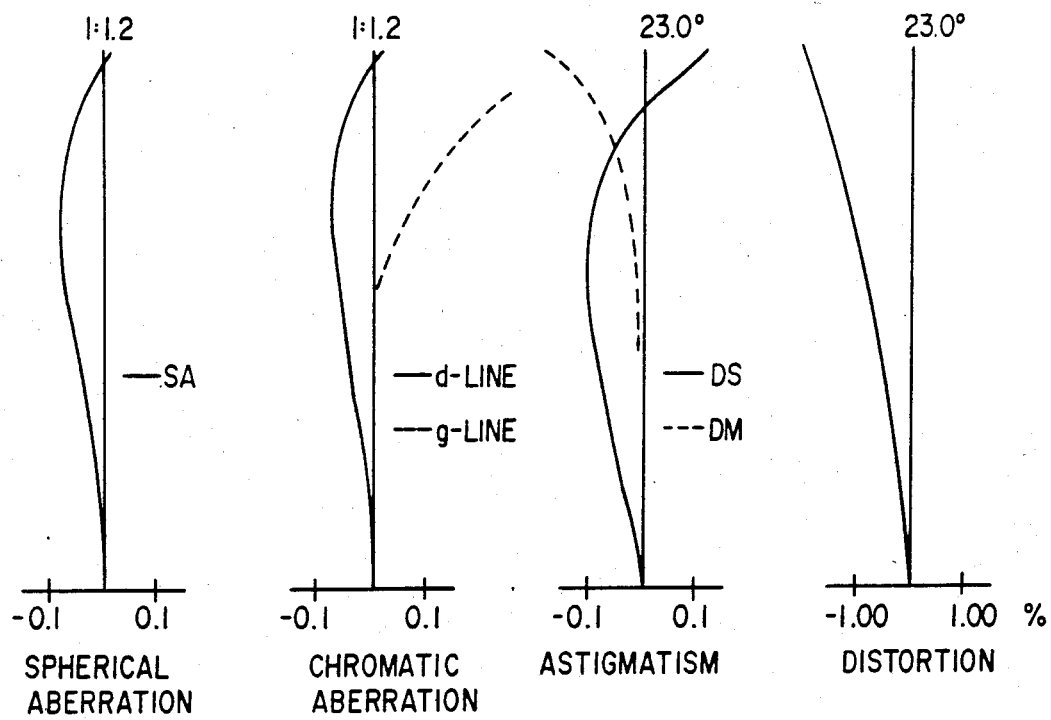
FIG. 2 is a diagram showing aberrations produced by the photographic lens shown in FIG. 1.
Figure 3:
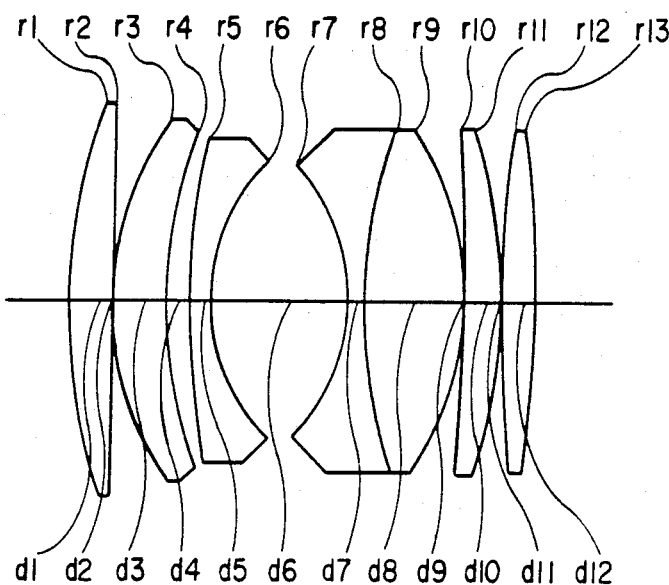
FIG. 3 is a schematic view of the arrangement of a photographic lens according to Example 2 of the present invention.
Figure 4:
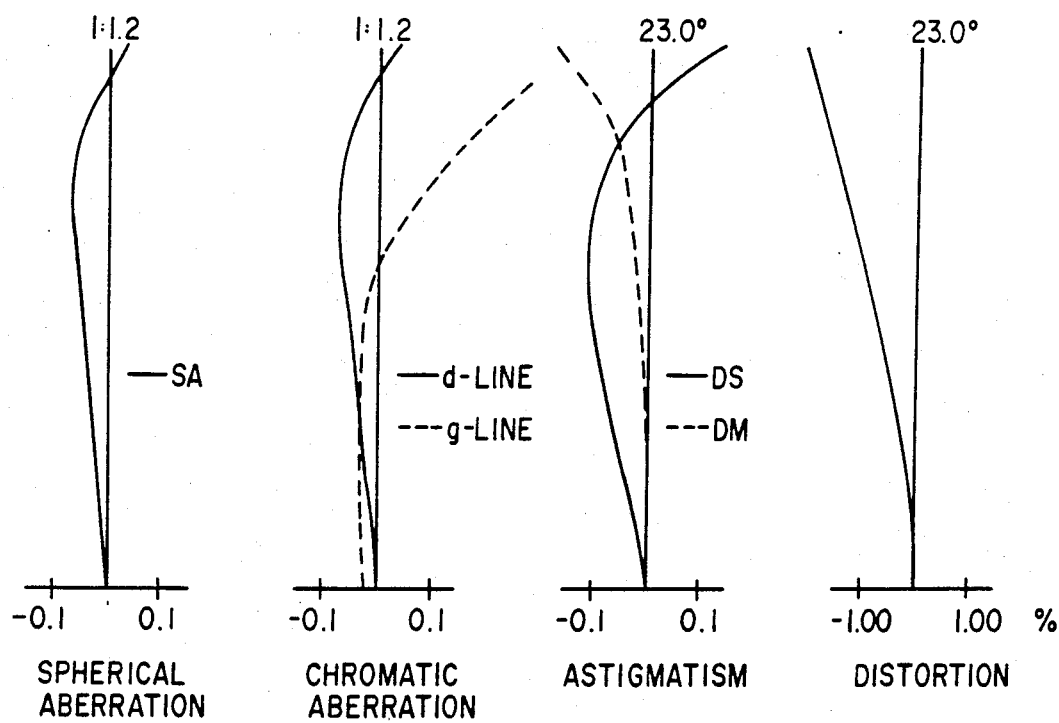
FIG. 4 is a diagram showing aberrations produced by the photographic lens shown in FIG. 3.
Figure 5:
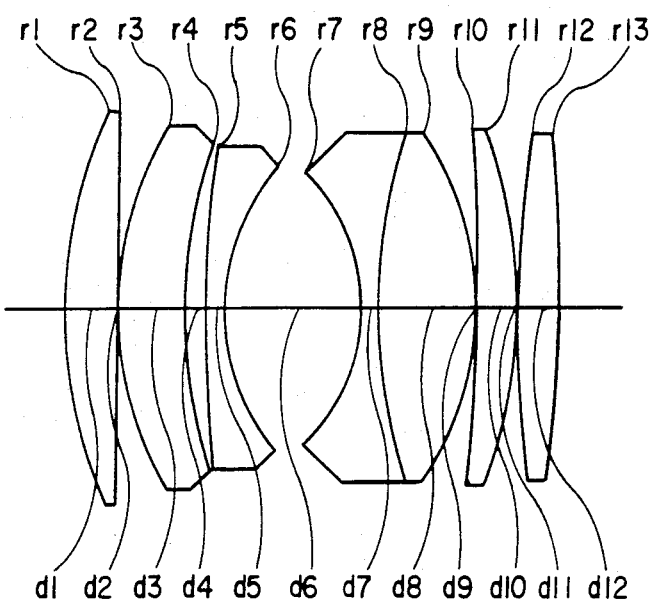
FIG. 5 is a schematic view of the arrangement of a photographic lens according to Example 3 of the present invention.
Figure 6:
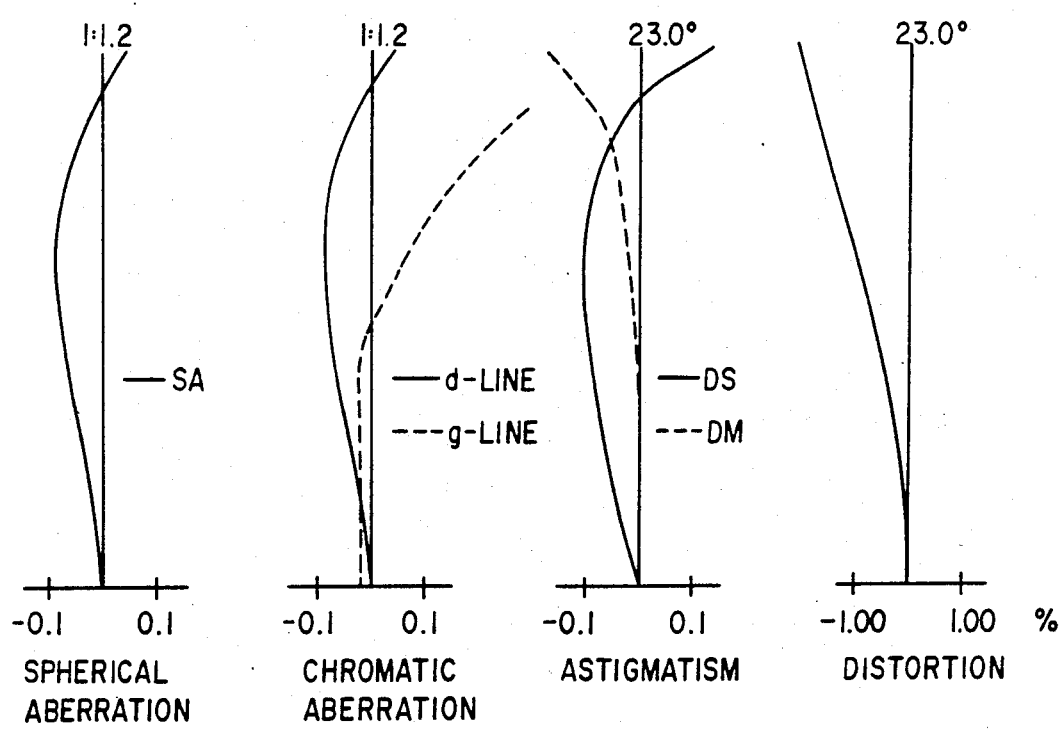
FIG. 6 is a diagram showing aberrations produced by the photographic lens shown in FIG. 5.

A photographic lens with a large aperture ratio according to the present invention is composed of seven elements in six groups, that is, a first positive lens, a second positive-meniscus lens, a third negative-meniscus lens, a compound lens comprising a fourth negative lens having opposite concave surfaces and a fifth positive lens having opposite convex surfaces, a sixth positive lens, and a seventh positive lens, successively arranged in order from an object, at least one of the lens elements being given a monotonous refractive index variation in the direction of an optical axis of the lens.

For effective correction of aberrations such as spherical aberration and coma, the second positive-meniscus lens in a photographic lens according to Example 1 has a gradient refractive index reduced monotonously from an object toward an image for thereby weakening the power of a third surface with respect to a light ray passing through the peripheral edge of the second positive lens. The third negative-meniscus lens in photograhic lenses according to Examples 2 and 3 have a gradient refractive index increased monotonously from an object toward an image for thereby strengthening the power of a sixth surface with respect to a light ray passing through the peripheral edge of the third negative lens.

If the variation $\Delta N$ in the refractive indexes of the second positive lens and the third negative lens were smaller than $0.0004 f$ [f is the focal length (mm) of the overall lens system], then it would be easy to fabricate the lenses, but difficult to render the lenses sufficiently effective in use. If the variation $\Delta N$ were greater than 0.06, then it would be difficult to manufacture the lenses easily with the fabrication technique available today. If the depth t of variation of the gradient refractive index were not 0.06 f or greater, then it would not sufficiently be effective, and if the depth t exceeded 10 mm, then the lenses would be difficult to fabricate.

The Examples 1, 2, and 3 according to the present invention will now be described. Designated at r is a radius of curvature, d a lens thickness or an inter-lens distance, n a refractive index with respect to d-line, and $\nu$ an Abbe number.

EXAMPLE 1

| | F number 1:1.2 f = 52.0 | | | |
|---|---|---|---|---|
| | r | d | n | $\nu$ |
| 1 | 47.932 | 6.826 | 1.81600 | 46.6 |
| 2 | 367.528 | 0.100 | | |
| 3 | 38.320 | 5.000 | 2nd positive-meniscus lens | |
| 4 | 62.256 | 2.196 | | |
| 5 | 140.481 | 2.400 | 1.58144 | 40.7 |
| 6 | 21.599 | 15.556 | | |
| 7 | −20.785 | 1.800 | 1.80518 | 25.4 |
| 8 | 77.603 | 10.206 | 1.81600 | 46.6 |
| 9 | −32.739 | 0.100 | | |
| 10 | −610.232 | 4.802 | 1.88300 | 40.8 |
| 11 | −53.285 | 0.100 | | |
| 12 | 186.885 | 3.478 | 1.88300 | 40.8 |
| 13 | −196.317 | | | |

The second positive-meniscus lens comprises a lens with a gradient refractive index.
Reference glass 1.696800/55.5
Refractive index distribution = reference index
$-0.638019 \times 10^{-2}$
$+0.209946 \times 10^{-3} \chi^2$
(in a positive direction of $\chi$ toward an image with the apex of the lens surface which faces an object serving as a reference point)
$\Delta N = 0.036$
$t = 7.56 = 0.15f$

EXAMPLE 2

| | F number 1:1.2 f = 52.0 | | | |
|---|---|---|---|---|
| | r | d | n | $\nu$ |
| 1 | 63.556 | 4.660 | 1.81600 | 46.6 |
| 2 | 721.256 | 0.100 | | |
| 3 | 33.801 | 6.050 | 1.83481 | 42.7 |
| 4 | 54.152 | 2.636 | | |
| 5 | 87.879 | 2.400 | 3rd negative-meniscus lens | |
| 6 | 22.007 | 14.845 | | |
| 7 | −21.699 | 1.800 | 1.80518 | 25.4 |
| 8 | 54.920 | 10.775 | 1.83481 | 42.7 |
| 9 | −34.392 | 0.100 | | |
| 10 | −319.325 | 4.202 | 1.88300 | 40.8 |
| 11 | −57.620 | 0.100 | | |
| 12 | 180.128 | 3.441 | 1.88300 | 40.8 |
| 13 | −147.351 | | | |

The third negative-meniscus lens comprises a lens with a gradient refractive index.
Reference glass 1.64769/33.8
Refractive index distribution = reference index
$+0.300008 \times 10^{-2}$
(in a positive direction of $\chi$ toward an image with the apex of the lens surface which faces an object serving as a reference point)
$\Delta N = 0.024$
$t = 8.11 = 0.16f$

EXAMPLE 3

| | F number 1:1.2 f = 52.0 | | | |
|---|---|---|---|---|
| | r | d | n | $\nu$ |
| 1 | 53.470 | 5.588 | 1.67000 | 57.4 |

-continued

| | F number 1:1.2 f = 52.0 | | | |
|---|---|---|---|---|
| | r | d | n | $\nu$ |
| 2 | 2291.832 | 0.100 | | |
| 3 | 38.205 | 7.628 | 1.72916 | 54.7 |
| 4 | 59.676 | 2.323 | | |
| 5 | 154.129 | 1.800 | 3rd negative-meniscus lens | |
| 6 | 22.505 | 15.055 | | |
| 7 | −21.262 | 1.800 | 1.84666 | 23.9 |
| 8 | 64.319 | 10.747 | 1.88300 | 40.8 |
| 9 | −33.417 | 0.100 | | |
| 10 | −267.629 | 4.217 | 1.88300 | 40.8 |
| 11 | −56.847 | 0.100 | | |
| 12 | 141.815 | 4.616 | 1.88300 | 40.8 |
| 13 | −188.313 | | | |

The third negative-meniscus lens comprises a lens with a gradient refractive index.
Reference glass 1.51602/56.8
Refractive index distribution = reference index
$+0.354738 \times 10^{-2}$
(in a positive direction of $\chi$ toward an image with the apex of the lens surface which faces an object serving as a reference point)
$\Delta N = 0.026$
$t = 7.34 = 0.14f$ Although a certain preferred embodiment has been shown and described, it should be understood that many changes and modifications may be made therein without departing from the scope of the appended claims.

What is claimed is:

1. A photographic lens with a large aperture ratio comprising a plurality of lens elements brighter than F 1.5 and having a total covering power of at least 40°, with at least one of the lens elements being capable of passing an entire luminous flux focusing on a center of an image plane through at least 80 percent of a lens aperture thereof, said plurality of lens elements including seven elements in six groups composed of a first positive lens, a second positive-meniscus lens, a third negative-meniscus lens, a compound lens comprising a fourth negative lens having opposite concave surfaces and a fifth positive lens having opposite convex surfaces, a sixth positive lens, and a seventh positive lens, successively arranged in order from an object, said at least one lens element being given a monotonous refractive index variation in the direction of an optical axis of the lens.

2. A photographic lens according to claim 1, wherein said at least one lens element comprises said second positive-meniscus lens with a refractive index thereof being monotonously reduced away from the object.

3. A photographic lens according to claim 1, wherein said at least one lens element comprises said third negative-meniscus lens with a refractive index thereof being monotonously increased away from the object.

4. A photographic lens according to claim 2 or 3, wherein said at least one lens element has a monotonous refractive index variation $\Delta N$ through a depth t, the variation $\Delta N$ and the depth t satisfying the following relations:

$$0.0004 F < |\Delta N| < 0.06$$

$$0.06 f < t < 10 \text{ (mm)}$$

where f is the focal length (mm) of the overall lens system.

5. A photographic lens with a large aperture ratio comprising a plurality of lens elements brighter than F 1.5 and having a total covering power of at least 40°, with at least one of the lens elements being capable of passing an entire luminous flux focusing on a center of an image plane through at least 80 percent of a lens aperture thereof and said at least one lens element having a monotonous refractive index variation in the direction of an optical axis of the lens ΔN through a depth t, the variation ΔN and the depth t satisfying the following relations:

0.0004 f < |ΔN| < 0.06

0.06 f < t < 10 (mm)

where f is the focal length (mm) of the overall lens system.

* * * * *